(12) United States Patent
Cheng

(10) Patent No.: US 6,718,455 B1
(45) Date of Patent: Apr. 6, 2004

(54) MULTIMEDIA-INSTRUCTION ACCELERATION DEVICE AND METHOD THEREOF

(75) Inventor: Nai-Sheng Cheng, Hsinchu (TW)

(73) Assignee: Via Technologies, Inc., Taipei (TW)

( * ) Notice: Subject to any disclaimer, the term of this patent is extended or adjusted under 35 U.S.C. 154(b) by 672 days.

(21) Appl. No.: 09/614,540

(22) Filed: Jul. 12, 2000

(51) Int. Cl.[7] ................................................. G06F 9/22
(52) U.S. Cl. ........................................ 712/200; 345/519
(58) Field of Search ................................ 345/519, 520, 345/522; 712/200

(56) References Cited

U.S. PATENT DOCUMENTS

| | | | | |
|---|---|---|---|---|
| 5,268,995 A | * | 12/1993 | Diefendorff et al. | 345/422 |
| 5,884,071 A | * | 3/1999 | Kosaraju | 712/245 |
| 6,131,104 A | * | 10/2000 | Oberman | 708/204 |
| 6,144,322 A | * | 11/2000 | Sato | 341/67 |
| 6,567,942 B1 | * | 5/2003 | Shepard, III | 714/726 |

* cited by examiner

Primary Examiner—Eric Coleman
(74) Attorney, Agent, or Firm—Rosenberg, Klein & Lee

(57) ABSTRACT

The present invention proposes a multimedia-instruction acceleration device and a method thereof, which uses instruction strings having a floating-point value check field to execute commands of single-instruction/multi-data format. The present invention can effectively save executing time and simplify numerical calculation process, and can fully exploit memory space to achieve the object of increasing acceleration operation and execution of 3D multimedia instructions. Moreover, an instruction of another mode can be added among the multi-data pertaining to a single 3D instruction so that another program such as a voice-playing program can be executed during the process of 3D acceleration operation. The performance of the multimedia program can thus be enhanced.

15 Claims, 4 Drawing Sheets

MULTIMEDIA-INSTRUCTION ACCELERATION DEVICE AND METHOD THEREOF

FIELD OF THE INVENTION

The present invention relates to a multimedia-instruction acceleration device and a method thereof, which uses instruction strings having a floating-point value check field to execute commands of single-instruction/multi-data format. The present invention can effectively save executing time and simplify numerical calculation process, and can fully exploit memory space to achieve the object of increasing acceleration operation and execution of multimedia instructions.

BACKGROUND OF THE INVENTION

Along with the continual progress of computer technology, the peripheral products thereof evolve. High-end peripheral devices have been successively developed. With a multimedia acceleration card including three-dimensional (3D) technology now hot in computer industry as an example, it provides expanded specific memories and assists to enhance the graphic calculation of a central processing unit (CPU). The graphic display resolution of a general computer can be effectively improved, especially for the processing of 3D graphics. However, for devices having a multimedia acceleration card in prior art, every multimedia data needs to be written in a specific input/output (I/O) port address. Therefore, the instruction is generally of single-instruction/single-data format. That is, one data must be matched to one instruction. Therefore, if a plurality of data need to be processed, a plurality of instructions are required. Redundancy of instructions and data will easily arise and memory space will be wasted. Moreover, execution time will be increased, and display error of graphics variation may even arise indirectly.

Besides, because long instructions and execution time of 3D display will influence the quality of voices played, discontinuity may occur in voices. Therefore, a 3D display program and a voice-playing program generally can not be executed simultaneously.

SUMMARY AND OBJECTS OF THE PRESENT INVENTION

Accordingly, the primary object of the present invention is to provide a multimedia-instruction acceleration device and a method thereof, which uses instruction strings having a floating-point value check field to execute commands of single-instruction/multi-data format. The present invention can effectively save executing time and simplify numerical calculation process, and can fully exploit memory space to achieve the object of increasing acceleration operation and execution of multimedia instructions.

Another object of the present invention is to provide a multimedia-instruction acceleration device and a method thereof, which uses instruction strings having a floating-point value check field to execute commands of single-instruction/multi-data format, and further inserts an instruction of another mode among the multi-data pertaining to the single instruction. The present invention can thus execute a voice-playing program during the process of 3D acceleration operation to enhance the performance of the multimedia program.

The various objects and advantages of the present invention will be more readily understood from the following detailed description when read in conjunction with the appended drawings, in which:

BRIEF DESCRIPTION OF DRAWING

FIG. 4A is a diagram showing the format of mode-0 control instructions according to a preferred embodiment of the present invention;

FIG. 4B is a diagram showing the format of mode-1 control instructions according to a preferred embodiment of the present invention;

FIG. 4C is a diagram showing the format of mode-2 control instructions according to a preferred embodiment of the present invention;

FIG. 4D is a diagram showing the format of mode-3 control instructions according to a preferred embodiment of the present invention;

FIG. 4E is a diagram showing the format of mode-4 control instructions according to a preferred embodiment of the present invention.

DETAILED DESCRIPTION OF PREFERRED EMBODIMENT

Figure 1:
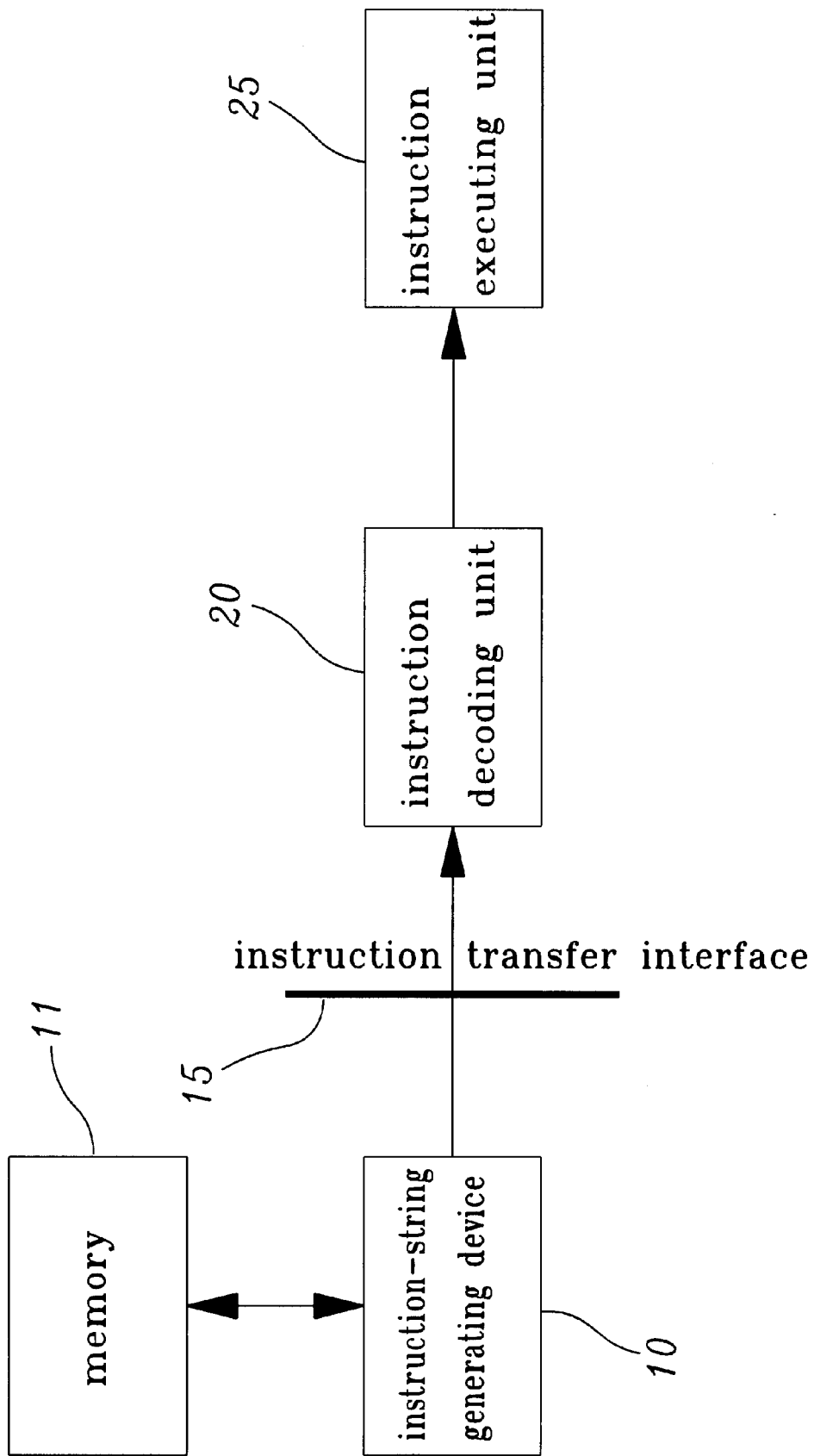
FIGS. 1 and 2 are block diagrams according to a preferred embodiment of the present invention.
Figure 2:
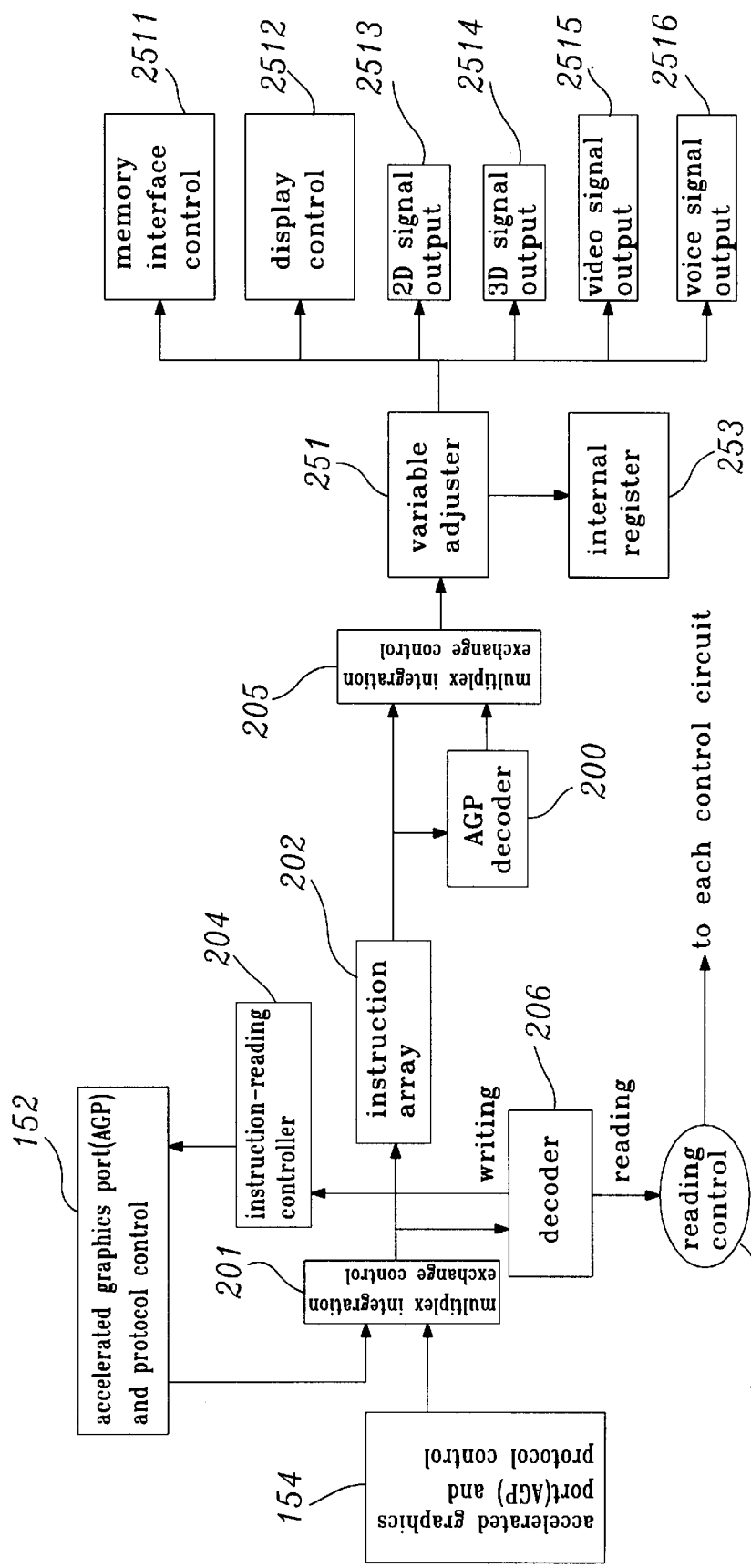

FIGS. 1 and 2 show block diagrams according to a preferred embodiment of the present invention. As shown in FIG. 1, the present invention comprises mainly a memory 11, an instruction-string generating device 10, an instruction decoding unit 20, and an instruction executing unit 25. The memory 11 can be any dynamic random access memory (DRAM), static random access memory (SRAM), read-only memory (ROM), magnetic storing device, or optical storing device. The instruction-string generating device 10 can be a CPU of a computer, a hardware interface device, a firmware, or a software program, whose primary function is to generate or edit instruction data having a floating-point range-check field for operation. The instruction generated or edited by the instruction-string generating device 10 is transferred to the instruction decoding unit 20 via a transfer interface 15 to be decoded. That is, the instruction data is checked to see whether it has the floating-point range-check field. The result is then transferred to the instruction executing unit 25 for display. As shown in FIG. 2, the instruction decoding unit 20 comprises an instruction array 202, a decoder 206, an instruction-reading controller 204, an accelerated graphics port (AGP) decoder 200, a variable adjuster 251, and an internal register 253. When the instruction-reading controller 204 issues requests to read instructions, multimedia instructions are transferred to a multiplex integration exchange control 201 via an accelerated graphics port (AGP) and its protocol control 152 or a peripheral component interconnect (PCI) and its protocol control 154 for exchange and arrangement of instructions and data. The results are then output to the instruction array 202 and the decoder 206. When the input instruction is used as a reading-control command, the decoder 206 decodes the instruction and then transfers to the instruction-reading controller 204. When the input instruction is used to read the content of each control circuit, the decoder 206 decodes the instruction data and transfers to a reading control 208 and then to each control circuit. On the other hand, when the input instruction is used to write instructions to each multimedia executing unit, the instruction array 202 collects the instruction data for batch processing, and then transfers to the AGP decoder 200 to decode the processed instruction data (please refer to FIG. 3). The result is then arranged by the multiplex integration exchange control 205 and then transferred to the instruction executing unit 25 comprising the variable adjuster 251 and the internal register 253. Therefore, when the instruction data is transferred to the variable adjuster 251, the variable adjuster 251 will execute a program to edit the internal register 253 or execute each function output such as a memory interface output 2511, a display controller 2512, a 2D signal output 2513, a 3D signal output 2514, a video signal output 2515, and a voice signal output 2516. The internal register 253 is used to record and store the parameters and data used in the instruction executing unit 25.

Moreover, through the instruction-insertion function of the present invention, each multimedia function can be executed simultaneously. It is not necessary to wait for the completion of other units. Control instructions need not to be transferred repeatedly. The instruction array 202 can save storing space for other uses and secure the balance of system efficiency. These are the advantages of commands of single-instruction/multi-data format. Therefore, when each function output is executed, process time of repeatedly encoding control instructions can be saved to complete the execution of each instruction more efficiently.

On the other hand, among the multi-data pertaining to a single instruction, an instruction of another mode can be added so that another program such as a voice-playing program can be executed during the process of 3D acceleration operation. The performance of the multimedia program can thus be enhanced.

The present invention uses the exponent field in the standard IEEE floating-point representation to determine whether the floating-point value is within the reasonable input range. If the floating-point value is not within the reasonable input range, it may be a control instruction of a certain mode; otherwise, it is properly processed according to different detection time, as shown in FIG. 3.

Figure 3:
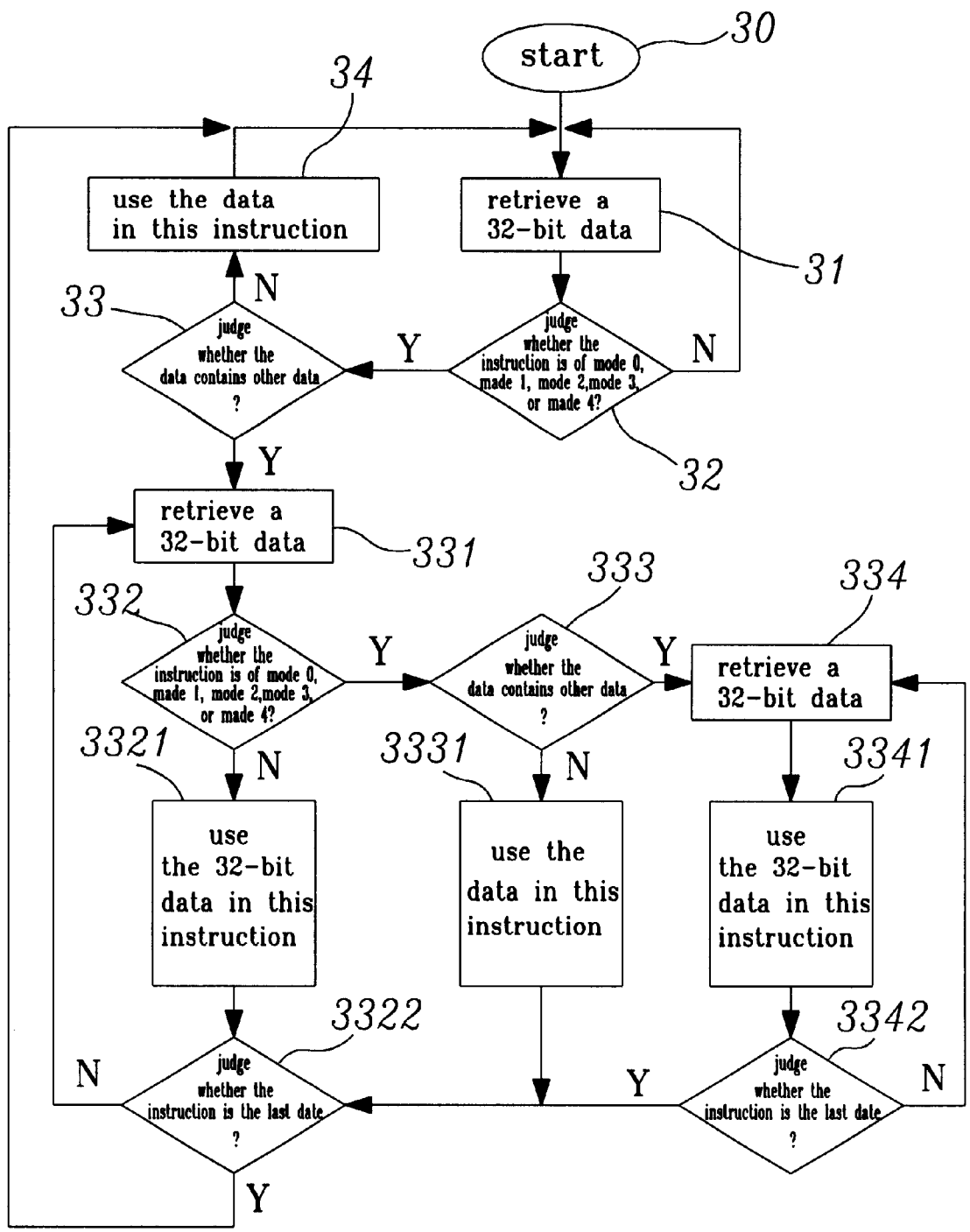
FIG. 3 is a decoding flowchart according to a preferred embodiment of the present invention.

FIG. 3 shows the operational flowchart of the AGP decoder 200 when only the first-order instruction-insertion function is provided according to a preferred embodiment of the present invention. In Step 30, decoding is started. In Step 31, a 32-bit data is retrieved. In Step 32, whether the data is an instruction of mode 0, mode 1, mode 2, mode 3, or mode 4 is judged; if the answer is negative, Step 31 is repeated until the data is an instruction of the edited mode. Next, in Step 33, whether the data contains other data is judged. If the data does not contain other data, the data is used in this instruction in Step 34 and Step 31 is repeated after completion of Step 34. If the data contains other data, a 32-bit data is further retrieved in Step 331 and whether the data is an instruction of mode 0, mode 1, mode 2, mode 3, or mode 4 is judged in Step 332. If the data is not an instruction of mode 0, mode 1, mode 2, mode 3, or mode 4, the 32-bit data is used in this instruction in Step 3321. In Step 3322, whether the instruction is the last data is judged. If the instruction is not the last data, Step 331 is again executed. If the instruction is the last data, Step 31 is jumped back to execute the next instruction. On the other hand, if the data is judged to be an instruction of mode 0, mode 1, mode 2, mode 3, or mode 4 in Step 332, whether the data contains other data is judged in Step 333. If the data does not contain other data, the 32-bit data is used in this instruction in Step 3331. Next, whether the instruction is the last data is judged in Step 3322. If the instruction is not the last data, Step 331 is again executed. If the instruction is the last data, Step 31 is jumped back to execute the next instruction. If the data is judged to contain other data in Step 333, a 32-bit data is further retrieved in Step 334 and used in this instruction in Step 3341. Finally, whether the instruction is the last data is judged in Step 3342. If the instruction is the last data, Step 3322 is jumped to; otherwise, Step 334 is repeated.

Thereby, the decoding procedures of the first-order instruction-insertion can be completed. If the decoding procedures of the Nth-order instruction-insertion are needed, it is only necessary to repeatedly execute Steps 332 to 3342 till the required order of instruction data to be decoded is attained.

Figures 4A, 4B, 4C, 4D, 4E:
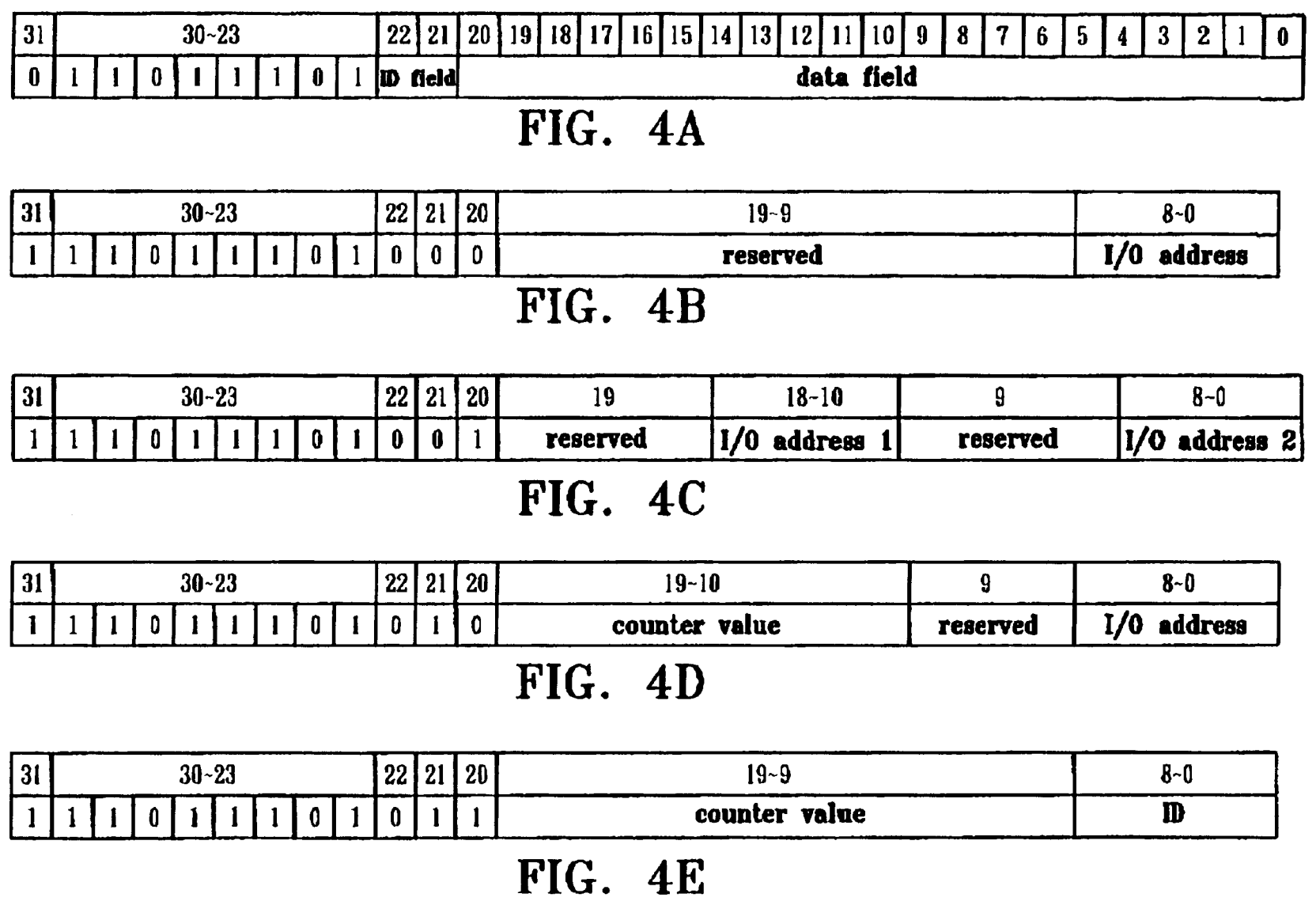

As shown in FIGS. 4A to 4E, Bit 23 to Bit 30 in the format of each mode of control instructions correspond to a binary logic value of 11111111, representing that the floating-point value is outside the range of $-2^{128}$ to $2^{128}$. Bit 31 and Bit 22 to Bit 20 in the format of each mode of control instructions are used to determine the mode of a control instruction. FIG. 4A shows an instruction of mode 0, wherein Bit 31 is fixed to be a binary logic value of 0. Bit 22 to Bit 21 are the instruction identification field, while Bit 0 to Bit 20 are reserved as the instruction data field. FIG. 4B shows an instruction of mode 1, wherein Bit 31 is fixed to be a binary logic value of 1. Bit 22 to Bit 20 correspond to a binary logic value of 000. This mode contains an I/O address stored in Bit 8 to Bit 0. Other bit fields are reserved for other uses. FIG. 4C shows an instruction of mode 2, wherein Bit 31 is fixed to be a binary logic value of 1. Bit 22 to Bit 20 correspond to a binary logic value of 001. This mode contains two I/O addresses, wherein the I/O address 1 is stored in Bit 18 to Bit 10 and the I/O address 2 is stored in Bit 8 to Bit 0. Other bit fields are reserved for other uses. FIG. 4D shows an instruction of mode 3, wherein Bit 31 is fixed to be a binary logic value of 1. Bit 22 to Bit 20 correspond to a binary logic value of 010. This mode contains an I/O address stored in Bit 8 to Bit 0 and a counter-value storing field situated from Bit 19 to Bit 10. Other bit fields are reserved for other uses. FIG. 4E shows an instruction of mode 4, wherein Bit 31 is fixed to be a binary logic value of 1. Bit 22 to Bit 20 correspond to a binary logic value of 011. This mode contains a counter-value storing field situated from Bit 19 to Bit 9 and an identification field stored from Bit 8 to Bit 0.

Summing up, the present invention proposes a multimedia-instruction acceleration device and a method thereof, which uses instruction strings having a floating-point value check field to execute commands of single-instruction/multi-data format. The present invention can effectively save executing time and simplify numerical calculation process, and can fully exploit memory space to achieve the object of increasing acceleration operation and execution of multimedia instructions.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A multimedia-instruction acceleration device for effectively increasing efficiency, comprising:

a memory;

an instruction-string generating device connected to said memory and used to access data and instructions in said memory and to encode said instructions, said instruction-string generating device including means for generating instructions having a floating-point range-check field representing single instructions corresponding to multiple data;

an instruction transfer interface connected to said instruction-string generating device and used to provide connection for each instruction transfer;

an instruction decoding unit connected to an output of said instruction transfer interface and used to decode said encoded instructions, said instruction decoding unit including a decoder and an instruction array, each said instruction being transferred to both said decoder and said instruction array, said decoder providing a decoded instruction output of reading-control commands; and an instruction executing unit connected to an output of said instruction array of said instruction decoding unit, said instruction array providing an output responsive to writing-control commands.

2. The multimedia-instruction acceleration device of claim 1, wherein said instruction decoding unit further includes an AGP decoder coupled to said output of said instruction array for decoding said floating-point range-check field to detect if a control instruction of one of a plurality of predetermined modes is received and associate corresponding data therewith.

3. The multimedia-instruction acceleration device of claim 1, wherein a format of the instruction string generated and encoded by said instruction-string generating device is one of 32-bits or 64-bits long.

4. The multimedia-instruction acceleration device of claim 3, wherein the format of the instruction string generated and encoded by said instruction-string generating device is 32-bits long, and Bit 23 to Bit 30 thereof corresponds to said floating-point range-check field.

5. The multimedia-instruction acceleration device of claim 3, wherein the format of the instruction string generated and encoded by said instruction-string generating device is 64-bits long, and Bit 52 to Bit 62 thereof corresponds to said floating-point range-check field.

6. The multimedia-instruction acceleration device of claim 3, wherein the format of said instruction string further contains a mode field of a control instruction.

7. The multimedia-instruction acceleration device of claim 6, wherein said mode field of control instruction in the format of said instruction string corresponds to Bit 31 and Bit 22 to Bit 20 thereof.

8. The multimedia-instruction acceleration device of claim 3, wherein said instruction decoding unit further includes an AGP decoder coupled to said output of said instruction array for decoding said floating-point range-check field to detect if a control instruction of one of a plurality of predetermined modes is received and associate corresponding data therewith.

9. The multimedia-instruction acceleration device of claim 1, wherein said instruction executing unit is at least one of a memory interface, a display controller, a 2D signal output, a 3D signal output, a video signal output, or a voice signal output.

10. An execution method for commands of single-instruction/multi-data format, especially an interminable-reception execution method for commands of single-instruction/multi-data format, comprising the steps of:

(a). receiving a sequential data being a floating-point value and comprising at least a time field and a numeral data;

(b). judging whether the floating-point value of said floating-point field is reasonable and within specific range thereof;

(c). receiving the next data possibly being an inserted single-instruction/multi-data period if the floating-point value is reasonable but not within specific range thereof; and (d). receiving the next data and repeating said Step (a) after insertion of said single-instruction/multi-data period is completed.

11. The execution method of claim 10, wherein said single-instruction/multi-data can comprise a single instruction having no data.

12. The execution method of claim 10, wherein processing of said interminable-reception can be controlled by said command of single-instruction/multi-data format to determine whether to continue executing the reception function.

13. The execution method of claim 10, wherein whether the floating-point value is reasonable and within specific range thereof in said Step (b) can be determined by said floating-point value-check field.

14. The execution method of claim 10, wherein said inserted command of single-instruction/multi-data format in said Step (c) can comprise said null instruction.

15. The execution method of claim 14, wherein said null instruction is an instruction writing data to a null address or an instruction whose counter value of auxiliary data is set to zero.

* * * * *